(12) United States Patent
Cabioch et al.

(10) Patent No.: US 7,470,760 B2
(45) Date of Patent: Dec. 30, 2008

(54) DIENE ELASTOMERS WITH CYCLIC VINYL UNITS AND PROCESSES FOR OBTAINING SAME

(75) Inventors: Jean-Luc Cabioch, Chateaugay (FR); Laurent Coissieux, Gerzat (FR); Nicole Dajoux, Ceyrat (FR)

(73) Assignee: Michelin Recherche Et Technique, S.A., Granges-Paccot (CH)

( * ) Notice: Subject to any disclaimer, the term of this patent is extended or adjusted under 35 U.S.C. 154(b) by 110 days.

(21) Appl. No.: 10/756,386

(22) Filed: Jan. 14, 2004

(65) Prior Publication Data

US 2004/0147696 A1    Jul. 29, 2004

Related U.S. Application Data

(63) Continuation of application No. PCT/EP02/07866, filed on Jul. 16, 2002.

(30) Foreign Application Priority Data

Jul. 16, 2001    (FR)    .................... 01 10287

(51) Int. Cl.
  *C08F 4/48* (2006.01)
  *B01J 31/12* (2006.01)
  *C08F 36/04* (2006.01)

(52) U.S. Cl. ............... 526/174; 526/175; 526/180; 526/181; 526/335; 525/331.9; 502/154; 502/155; 502/156

(58) Field of Classification Search ............. 526/174, 526/175, 335, 340, 180, 181; 502/154, 155, 502/156; 525/331.9
See application file for complete search history.

(56) References Cited

U.S. PATENT DOCUMENTS

| | | | |
|---|---|---|---|
| 3,301,840 A | * | 1/1967 | Zelinski ................. 526/181 |
| 3,801,554 A | | 4/1974 | Selman |
| 3,966,691 A | | 6/1976 | Halasa |
| 4,316,820 A | | 2/1982 | Wieder et al. |
| 4,331,823 A | | 5/1982 | Wieder et al. |
| 4,894,425 A | * | 1/1990 | Hellermann et al. ........ 526/181 |
| 5,008,343 A | * | 4/1991 | Hellermann et al. ........ 525/316 |
| 5,336,739 A | * | 8/1994 | Hsu et al. ................... 526/181 |
| 5,620,939 A | | 4/1997 | Halasa et al. |
| 6,140,434 A | | 10/2000 | Halasa et al. |

FOREIGN PATENT DOCUMENTS

GB    2 020 670    11/1979

* cited by examiner

*Primary Examiner*—Fred M Teskin
(74) *Attorney, Agent, or Firm*—Buchanan Ingersoll & Rooney PC

(57) ABSTRACT

The present invention relates to a linear or branched diene elastomer having cyclic vinyl units. A linear diene elastomer according to the invention results from at least one conjugated diene and it comprises cyclic vinyl units in a mass content of greater than or equal to 15% while having a number-average molecular weight falling within a range of from 10,000 to 300,000 g/mol. The invention also relates to a process for the production of such a linear or branched diene elastomer including cyclic vinyl units in the above-stated content and having a number-average molecular weight ranging from 10,000 to 300,000 g/mol, such that said process includes the continuous reaction of at least one conjugated diene monomer in an inert aliphatic or alicyclic hydrocarbon solvent with a catalytic system comprising an organolithium initiator, a polar agent having two or more heteroatoms and an alkali metal salt of an aliphatic or alicyclic alcohol, where:
(i) the (polar agent:initiator) molar ratio is greater than or equal to 3.
(ii) the (salt:initiator) molar ratio falls within a range of from 0.01 to 2, and
(iii) the (salt:polar agent) molar ratio falls within a range of from 0.0001 to 0.5.

25 Claims, No Drawings

DIENE ELASTOMERS WITH CYCLIC VINYL UNITS AND PROCESSES FOR OBTAINING SAME

The present application is a continuation of International Application No. PCT/EP02/07866, filed Jul. 16, 2002, which is incorporated by reference.

The present invention relates to linear or branched diene elastomers having a mass content of cyclic vinyl units, such as vinylcycloalkane units, which is greater than or equal to 15%, to processes for the anionic production of said diene elastomers and to catalytic systems for carrying out said processes.

A conjugated diene monomer, such as butadiene, may be incorporated into a polymer obtained anionically in the form cis-1,4, trans-1,4 or -1,2 (vinyl linkages).

Anionic polymerisation reactions are conventionally initiated by an organolithium compound in the presence of a hydrocarbon solvent and one or more conjugated diene monomers. The elastomers produced by these reactions have a low average mass content of vinyl linkages, generally being between 8% and 15%. In order to obtain elastomers having a given glass transition temperature (Tg), it is known to add to the polymerisation medium a polar agent, which also has the effect of significantly increasing the average content of these linkages. This content may then reach 90%, for example.

U.S. patent specifications U.S. Pat. Nos. 5,620,939, 5,906,956 and 6,140,434 disclose anionic polymerisation processes which are performed discontinuously, are intended to increase the content of vinyl linkages in a diene elastomer which may be a polybutadiene, a styrene-butadiene copolymer or a polyisoprene. These discontinuous polymerisation processes are carried out at a temperature of between 30 and 100° C. and they in particular involve the use of catalytic systems comprising:

a polar agent comprising one or more heteroatoms, such as tetrahydrofuran (THF) or tetramethylethylenediamine (TMEDA), an organolithium initiator, such as n-butyllithium, and an alkali metal salt of an aliphatic or alicyclic alcohol, such as sodium tert.-amylate or sodium mentholate.

More precisely, in its examples, document U.S. Pat. No. 5,620,939 discloses molar ratios of [(salt:initiator), (salt:polar agent), (polar agent:initiator)] which are equal to [1; 0.33; 3], [2; 0.66; 3], [3; 1; 3], [0.5; 0.17; 3], [1; 0.5; 2] and [1; 0.2; 5].

In its examples, document U.S. Pat. No. 5,906,956 discloses the following values for said molar ratios: [2; 1; 2], [0.5; 1; 0.5], [0.25; 0.08; 3], [0.5; 0.17; 3], [1; 0.33; 3], [1; 0.66; 3], [3; 1; 3], [0.5; 0.17; 3], [1; 0.5; 2] and [1; 0.2; 5].

In its examples, document U.S. Pat. No. 6,140,434 discloses the following values for said molar ratios: [0.25; 0.03; 8], [0.25; 0.05; 5], [0.25; 0.08; 3], [0.25; 0.25; 1], [0.25; 0.5; 0.5], [0.15; 0.05; 3], [0.5; 0.17; 3], [1; 0.33; 3] and [0.25; 0.13; 2].

Independently of the increase in the content of vinyl linkages in these elastomers, it has in the past been attempted to form vinylcyclopentane type cyclic structures (these cyclic structures are not mentioned in any of the above-mentioned three US patent specifications) in diene elastomers obtained anionically.

One solution for forming these cyclic structures involves performing post-polymerisation reactions, for example by treating the elastomers with Lewis acids.

Another solution may involve forming these cyclic structures directly during anionic polymerisation by performing said polymerisation continuously with a low monomer concentration in the reaction medium and using a specific catalytic system.

In its examples of embodiment, US patent specification U.S. Pat. No. 3,966,691 describes a process for cyclising butadiene in the polymerisation medium, which involves using a catalytic system comprising an initiator consisting of n-butylsodium and an activator consisting of tetramethylethylenediamine (TMEDA). A lithium alkoxide is optionally added to the polymerisation medium to accelerate polymerisation.

Polymerisation is performed continuously at a temperature of between −20° C. and 150° C., and the polybutadienes obtained have a mass content of cyclic structures of greater than 40%, but a number-average molecular weight of no more than 2,000 g/mol.

The articles "G. Quack, L. J. Fetters, Macromolecules, Vol 11, no. 2, pp. 369-373, (1978)" and "A. R. Luxton, M. E. Burrage, G. Quack, L. J. Fetters, Polymer, Vol 22, pp.382-386" also describe continuous cyclisation processes in the polymerisation medium, which involve using catalytic systems comprising an organolithium initiator, such as n-butyllithium, and a polar agent consisting of TMEDA (reference may be made to page 383, right hand column of the last-cited document for a description of the cyclisation mechanism).

The polymerisations are performed at temperatures of between 30 and 90° C. and the polybutadienes obtained have a mass content of vinylcyclopentane cycles of at least 18%, but a number-average molecular weight of no more than 5,000 g/mol.

One major disadvantage of these polymerisation processes is thus the very low value of the number-average molecular weight of the diene elastomers obtained.

The object of the present invention is to overcome this drawback, and said object is achieved in that the Applicant has surprisingly just discovered that performing anionic polymerisation of one or more monomers comprising at least one conjugated diene monomer, said polymerisation comprising the reaction in an inert aliphatic or alicyclic hydrocarbon solvent of the monomer or monomers with a catalytic system comprising an organolithium initiator and a polar agent comprising two or more heteroatoms, the reaction being performed:

(4) either discontinuously, the (polar agent:initiator) molar ratio being in this case greater than 8, (5) or continuously, the (polar agent:initiator) molar ratio being in this case greater than or equal to 3, makes it possible, in said case (1), to prepare a linear diene elastomer having both a mass content of cyclic vinyl units of greater than or equal to 15% and a number-average molecular weight (Mn) ranging from 10,000 g/mol to 60,000 g/mol, and makes it possible, in said case (2), to prepare a linear diene elastomer having both a mass content of cyclic vinyl units of greater than or equal to 15% and a weight Mn ranging from 10,000 g/mol to 300,000 g/mol, it being possible to achieve Mn values of greater than or equal to 100,000 on condition that an alkali metal salt of an aliphatic or alicyclic alcohol is incorporated into said catalytic system, such that the system simultaneously satisfies the following three conditions:

(i) the (polar agent:initiator) molar ratio is greater than or equal to 3.

(ii) the (salt:initiator) molar ratio falls within a range of from 0.01 to 2, and (iii) the (salt:polar agent) molar ratio falls within a range of from 0.001 to 0.5.

These cyclic vinyl units are of the vinylcycloalkane type, and they are of the following general formula:

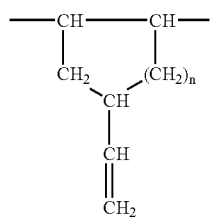

where n=1 or 2.

Organolithium initiators usable in this catalytic system according to the invention which may be mentioned are monolithiated compounds comprising an aliphatic or alicyclic hydrocarbon group having from 1 to 10 carbon atoms, such as n-butyllithium (hereinafter abbreviated to n-BuLi), sec-butyllithium, tert.-butyllithium, n-propyllithium, amyllithium, cyclohexyllithium or phenylethyllithium.

The quantity of initiator which is used to form the catalytic system is preferably between 0.002 and 0.01 mol per kg of monomer(s).

Polar agents comprising two or more heteroatoms (atoms of oxygen or nitrogen) usable in this catalytic system according to the invention which may be mentioned are "multidentate" polar agents, such as diethers and diamines, for example tetramethylethylenediamine (TMEDA), dimethoxyethane (DME), diethylcarbitol (DEC), triethylene glycol dimethyl ether (or "triglyme"), tetraethylene glycol dimethyl ether (or "tetraglyme"), or dipiperidinoethane.

This polar agent is used to form the catalytic system according to the invention in a content of between 300 and 30000 parts per million parts by weight of reaction medium (ppm) and, preferably, at a content of between 500 and 3000 ppm.

It will be noted that polar agents comprising a single heteroatom ("monodentate" agents), such as monoamines and monoethers, for example tetrahydrofuran (THF), are not suitable for carrying out the processes according to the invention since they do not allow the above-stated mass content of cyclic vinyl units in the diene elastomer to be obtained.

It will be noted that, unlike processes performed by means of known catalytic systems, the above-stated processes (1) or (2) according to the invention (discontinuous or continuous) make it possible to obtain linear diene elastomers having molecular weights Mn of greater than 10,000 g/mol.

It will be noted that said process (2), which comprises anionic polymerisation in a stirred continuous reactor of at least one conjugated diene monomer by the reaction, in an inert aliphatic or alicyclic hydrocarbon solvent, of the monomer or monomers with a catalytic system comprising said organolithium initiator and said polar agent comprising two or more heteroatoms, such that said relationship (i) is met, advantageously makes it possible to obtain linear elastomers with weights Mn of greater than or equal to 60,000 g/mol, or even of greater than or equal to 100,000 g/mol in the event that said salt is incorporated into the catalytic system, such that said system additionally satisfies the above-stated conditions (ii) and (iii).

This continuous process (2) according to the invention including the use of said salt is a preferred embodiment of the present invention, because it makes it possible to obtain diene elastomers having both very high molecular weights relative to the known prior art and a mass content of cyclic vinyl units of greater than or equal to 20%.

It will also be noted that the processes (1) and (2) according to the invention advantageously make it possible to control the molecular weight distribution of the diene elastomers obtained, which have a relatively low polydispersity index Ip (less than 3).

According to one example of embodiment of the invention, the linear diene elastomers obtained have a molecular weight Mn of from 10,000 to 30,000 g/mol and a mass content of cyclic vinyl units of greater than or equal to 35%.

In relation to said discontinuous process (1) according to the invention, which is characterised by a (polar agent:initiator) molar ratio value of greater than 8, this ratio is advantageously greater than or equal to 10 and, even more advantageously, greater than or equal to 15. It may, for example, be decided to restrict the value of this molar ratio to 100.

In relation to said continuous process (2) according to the invention, which is characterised by said condition (i) and optionally said conditions (ii) and (iii), the (polar agent:initiator) molar ratio is advantageously greater than or equal to 5 and, even more advantageously, this molar ratio is greater than or equal to 10. It may, for example, be decided to restrict the value of this molar ratio to 100.

Still more advantageously, in order to obtain linear diene elastomers of molecular weights Mn specifically greater than or equal to 100,000 g/mol by said continuous process (2), the catalytic systems according to the invention are such that the (polar agent:initiator) molar ratio is greater than or equal to 15, which represents very large quantities of polar agent in these catalytic systems relative to the quantities used in known catalytic systems. It may, for example, be decided to select a value of 15 to 40 for this molar ratio.

Alkali metal salts of an aliphatic or alicyclic alcohol usable in these processes which are preferably used are those, the alcohol of which comprises from 3 to 12 carbon atoms and, even more preferably, from 3 to 8 carbon atoms.

Advantageously, a sodium or potassium salt of an aliphatic alcohol is used, such as sodium tert.-butylate, sodium tert.-amylate or sodium isopentylate, or alternatively a sodium or potassium salt of an alicyclic alcohol, such as a dialkylated sodium cyclohexanolate, for example sodium mentholate.

According to one preferred feature of the invention, the catalytic system used in said continuous process (2) including said salt (characterised by said conditions (i), (ii) and (iii)) is such that the (salt:polar agent) molar ratio falls within a range of from 0.001 to 0.1.

According to another preferred feature of the invention, the catalytic system used in this continuous process (2) is such that the (salt:initiator) molar ratio falls within a range of from 0.01 to 0.6. According to a first example of embodiment of this preferred feature, this ratio falls within a range of from 0.01 to 0.2 and, according to a second example of embodiment, this ratio falls within a range of from 0.3 to 0.6.

According to a preferred example of embodiment of the invention, a catalytic system according to the invention, which is usable for producing a linear diene elastomer having a mass content of cyclic vinyl units of greater than or equal to 15% and a weight Mn of from 10,000 to 300,000 g/mol in accordance with said continuous process (2), comprises an organolithium initiator, a polar agent comprising two or more heteroatoms and an alkali metal salt of an aliphatic or alicyclic alcohol, and satisfies the following conditions:

(i') the (polar agent:initiator) molar ratio is greater than 8,
(ii) the (salt:initiator) molar ratio falls within a range of from 0.01 to 2, and (iii) the (salt:polar agent) molar ratio falls within a range of from 0.001 to 0.5.

Preferably in this latter example, this catalytic system is such that the (salt:initiator) molar ratio falls within a range of from 0.01 to 0.2 or from 0.3 to 2 and that the (salt:polar agent) molar ratio falls within a range of from 0.001 to 0.1.

This range of from 0.01 to 0.2 for the (salt:initiator) molar ratio is particularly suitable for obtaining, by the continuous process (2) according to the invention, linear elastomers of a molecular weight Mn of greater than or equal to 100,000 g/mol and having a mass content of cyclic vinyl units which is greater than or equal to 15%, advantageously greater than or equal to 20%.

The range of from 0.3 to 2 and, preferably, of from 0.3 to 0.6, for this (salt:initiator) molar ratio is particularly suitable for obtaining, by the continuous process (2) according to the invention, linear elastomers of a molecular weight Mn of less than or equal to 30,000 g/mol and having a mass content of cyclic vinyl units which is greater than or equal to 35%, advantageously greater than or equal to 40%.

It will be noted that these low molecular weight linear elastomers (Mn less than or equal to 30,000 g/mol) may advantageously be obtained with a small quantity of organolithium initiator in the catalytic system according to the invention, which helps to reduce the production costs for these low molecular weight elastomers.

Generally, it will furthermore be noted that the mass content of vinyl units in the diene elastomers obtained by the processes according to the invention is between 40% and 65%.

Inert hydrocarbon solvents usable in the processes according to the invention which may be mentioned are aliphatic or alicyclic solvents such as pentane, hexane, the commercial mixture of hexane/methylcyclohexane, heptane, methylcyclohexane or cyclohexane.

It will be noted that aromatic solvents, such as toluene, are not usable.

The diene elastomer according to the invention preferably comprises a mass fraction of units derived from conjugated dienes which is greater than 30% and may be any homopolymer or copolymer obtained by polymerisation:
- of a conjugated diene monomer having from 4 to 12 carbon atoms or of two or more of these conjugated diene monomers together, or alternatively
- of one or more of these conjugated diene monomers with one or more vinyl aromatic compounds each having from 8 to 20 carbon atoms.

Suitable conjugated diene monomers are, in particular, 1,3-butadiene, 2-methyl-1,3-butadiene, 2,3-di(C1-C5 alkyl)-1,3-butadienes such as 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, for example, styrene, ortho-, meta- and para-methylstyrene, the commercial mixture "vinyltoluene", para-tert.-butylstyrene or divinylbenzene. It will be noted that styrene is preferably used.

Preferably, in the process according to the invention, 1,3-butadiene and/or isoprene are used as the conjugated diene monomer(s), while styrene is used as the vinyl aromatic monomer in order to obtain copolymers of butadiene/isoprene (BIR), styrene/butadiene (SBR), styrene/isoprene (SIR) or butadiene/styrene/isoprene (SBIR).

Even more preferably, 1,3-butadiene and styrene are copolymerised to obtain an SBR having at least 70% by weight of butadiene and at most 30% by weight of styrene and, preferably, at least 90% of butadiene and at most 10% of styrene.

The diene elastomers obtained by the processes according to the invention may subsequently be branched (i.e. coupled or starred) or not.

Very particularly suitable starring agents are trichloromethylsilane, tetrachloromethylsilane, diphenyl carbonate or, even more preferably, tris(2,4-di-tert.-butylphenyl) phosphite, such as is described in U.S. patent specification U.S. Pat. No. 6,384,164 in the name of the Applicant.

A diene elastomer branched according to the present invention, which is likewise obtained from at least one conjugated diene and is capable of being obtained by reaction of said linear diene elastomer according to the invention with a branching (i.e. coupling or starring) agent, comprises cyclic vinyl units in a mass content of greater than or equal to 15% and has a number-average molecular weight of from 30,000 to 350,000 g/mol, advantageously of from 150,000 to 350,000 g/mol.

Advantageously, said mass content of cyclic vinyl units is greater than or equal to 20%.

The aforementioned characteristics of the present invention, as well as others, will be better understood on reading the following description of several examples of embodiment of the invention, which are given by way of illustration and not of limitation.

SEC (size exclusion chromatography) was used to determine the molecular weights and the polydispersity indices of the elastomers. According to this technique, the macromolecules are separated physically according to their respective sizes when swollen, in columns filled with a porous stationary phase.

A chromatograph sold under the name "WATERS" and under the model "150C" is used for the aforementioned separation. A set of two "WATERS" columns is used, the type being "STYRAGEL HT6E".

DSC (differential scanning calorimetry) was used to measure the glass transition temperatures (Tg) of the elastomers obtained.

Furthermore, carbon-13 nuclear magnetic resonance ($^{13}$C-NMR) was used to determine the microstructure characteristics of the elastomers obtained. The details of this characterisation are explained below.

$^{13}$C-NMR analyses are performed using a "Bruker AM250" spectrometer. The nominal frequency of carbon 13 is 62.9 MHz. To ensure quantitative results, the spectra are recorded without the "nuclear Overhauser effect" (NOE). Spectral width is 240 ppm. The impulse angle used is a 90° impulse with a duration of 5 µs. Low power decoupling and a wide proton band are used to eliminate scalar $^1$H—$^{13}$C coupling during $^{13}$C acquisition. The sequence repetition time is 4 seconds. The number of transients accumulated to increase the signal/noise ratio is 8192. The spectra are calibrated against the CDCl$_3$ band at 77 ppm.

Interpretation of the NMR spectra of SBR and BR has been the subject matter of many publications in the literature, for example the following documents:

(1) Q.-T. Pham, R. Pétiaud, H. Waton, M.-F. Llauro-Darricades, Proton and Carbon NMR Spectra of Polymers, Penton Press, London (1991).

(2) Sato H., Ishikawa, T., Takebayashi K., Tanaka Y., Macromolecules, 22, 1748-1753, (1989).

(3) Harwood, H., J. Rubber Chem. Technology, 55, 769-806, (1982).

(4) Kobayashi E., Furakawa J., Ochiai M., Tsujimoto T, European Polym. J., 19, 871-875, (1983).

(5) Jiao S., Chen X., Hu L., Yan B., Chinese J. Polym. Sci., 8, 17-24, (1990).

(6) Quack G., Fetters L. J., Macromolecules, 11, no. 2, 369-373, (1978).

In particular, vinylcyclopentane type structures were revealed and assigned in document (6) above.

The microstructures revealed for SBR and BR are as follows:

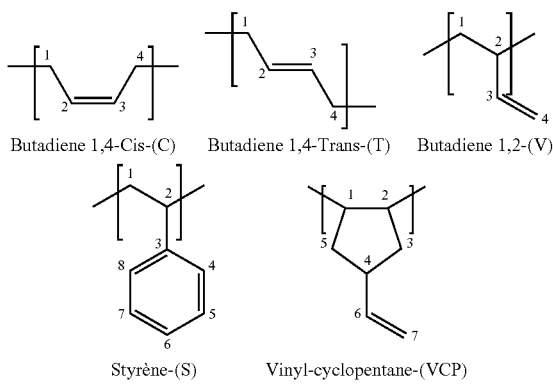

Butadiene 1,4-Cis-(C)   Butadiene 1,4-Trans-(T)   Butadiene 1,2-(V)

Styrène-(S)   Vinyl-cyclopentane-(VCP)

The table below summarises the chemical shifts corresponding to the various carbon atoms of these structures in the unsaturated carbon zone.

| Chemical shifts | Assignments Structure - No. of carbon observed |
|---|---|
| 145-140.6 | V-3, VCP-6 |
| 116.6-113.2 | V-4 |
| 126.5-124.9 | S-6 |
| 132.9-126.9 | S-4, S-5, S-7, S-8 C-2, C-3, T-2, T-3 |
| 145-140.6 | V-3, VCP-6 |
| 147.1-145 | S-3 |
| 113.2-111 | VCP-7 |

The cis/trans ratio in the diene moiety is determined in the aliphatic portion of the spectrum on the basis of assignments which are familiar to the person skilled in the art (see documents (1) to (5) above).

EXAMPLE 1

Production of a "Control", High Molecular Weight Linear SBR (Styrene-butadiene Copolymer)

Polymerisation is performed continuously in a 0.8 litre perfectly stirred reactor. Cyclohexane, butadiene, styrene and tetramethylethylenediamine (TMEDA) are introduced into this reactor in quantities by weight of 100:12.2:2.1:0.057 respectively (the quantity of tetramethylethylenediamine in the reaction medium being approximately 500 ppm). 200 µmol of n-BuLi per 100 g of monomers are introduced via the line inlet in order to neutralise the protic impurities introduced by the various constituents present in this line inlet. 700 µmol of n-BuLi per 100 g of monomers are introduced at the reactor inlet. The various flow rates are adjusted such that the average dwell time in the reactor is 40 minutes and the temperature is maintained at 80° C.

It will be noted that the (TMEDA:n-BuLi) molar ratio is here substantially equal to 4.9.

The conversion rate, which is measured on a sample taken at the reactor outlet, is 98%, and the inherent viscosity, which is measured at 0.1 g/dl in toluene, is 2.05 dl/g. At the reactor outlet, the SBR obtained is subjected to antioxidant treatment with 0.2 phr of 2,2'-methylene-bis(4-methyl-6-tert.-butylphenol) and 0.2 phr of N-(1,3-dimethylbutyl)-N'-phenyl-p-phenylenediamine (phr: parts by weight per hundred parts of elastomer).

The number-average molecular weight Mn of the linear SBR obtained, evaluated using the above-stated SEC method, is 130,000 g/mol. The polydispersity index Ip is 1.80.

The microstructure of this SBR according to the invention, determined using the above-mentioned $^{13}$C-NMR method stated above, is such that the butadiene moiety has a mass content of vinyl units of 53% and a mass content of vinylcyclopentane units of 10%.

Prior to extension with oil, the Tg of this SBR according to the invention is −31° C.

This Example shows that, in the absence of an alkali metal salt of an aliphatic or alicyclic alcohol in the catalytic system, polymerisation (even when carried out continuously with a (polar agent:initiator) molar ratio of greater than 3) does not give rise to a mass content of cyclic vinyl units of at least 15% for an elastomer with a high molecular weight Mn (greater than 100,000 g/mol).

EXAMPLE 2

Production of a High Molecular Weight Linear SBR According to the Invention

This SBR is produced continuously under conditions identical to those of Example 1, except that, in addition to the above-stated constituents, a solution of sodium tert.-amylate is introduced into the reactor in a sodium:active lithium ratio of 0.2.

It will be noted that the (TMEDA:n-BuLi) molar ratio is here substantially equal to 4.9.

The conversion rate, which is measured on a sample taken at the reactor outlet, is 97%, and the inherent viscosity of the SBR obtained, which is measured at 0.1 g/dl in toluene, is 1.80 dl/g.

The linear SBR obtained has a molecular weight Mn of 120,000 g/mol and an Ip index of 2.47.

In this SBR according to the invention, the mass content of styrene linkages is 15%. In the butadiene moiety, the mass content of vinyl linkages is 53% and the mass content of vinylcyclopentane units is 23%.

Prior to extension with oil, the Tg of this SBR according to the invention is −14° C.

This Example shows that, by incorporating an alkali metal salt of an aliphatic or alicyclic alcohol into the catalytic system, polymerisation (carried out continuously with a (polar agent:initiator) molar ratio of greater than 3) gives rise to a mass content of cyclic vinyl units of greater than 20% for a linear elastomer of a molecular weight of greater than 100,000 g/mol.

EXAMPLE 3

Production of a "Control", High Molecular Weight Starred SBR

This SBR is produced continuously in a 14 litre perfectly stirred reactor.

Cyclohexane, butadiene, styrene and tetramethylethylenediamine (TMEDA) are introduced into this reactor in quantities by weight of 100:13.6:0.7:0.17 respectively (the quantity of tetramethylethylenediamine in the reaction medium being approximately 1500 ppm). 300 µmol of n-BuLi per 100 g of monomers are introduced via the line inlet in order to neutralise the protic-impurities introduced by the various constituents present in this line inlet. 500 µmol of n-BuLi per 100 g of monomers are introduced at the reactor inlet, such that the (TMEDA:n-BuLi) molar ratio is approximately 20.5.

The various flow rates are adjusted such that the average dwell time in the reactor is 40 minutes and the temperature is maintained at 80° C.

The conversion rate, which is measured on a sample taken at the reactor outlet, is 84%, and the inherent viscosity of the linear SBR obtained, which is measured at 0.1 g/dl in toluene, is 2.21 dl/g. The molecular weight $Mn$ of this linear SBR is 135,000 g/mol.

At the reactor outlet, a starring agent consisting of tris(2,4-di-tert.-butylphenyl) phosphite is introduced, then this starred SBR is subjected to antioxidant treatment with 0.2 phr of 2,2'-methylene-bis(4-methyl-6-tert.-butylphenol) and 0.2 phr of N-(1,3-dimethylbutyl)-N'-phenyl-p-phenylenediamine.

The molecular weight $Mn$ of this starred SBR is 180,000 g/mol, and the Ip index is 1.85.

This starred SBR has a mass content of styrene linkages of 5%. The butadiene moiety has a mass content of vinyl units of 60% and a mass content of vinylcyclopentane units of 9%.

Prior to extension with oil, the Tg of this SBR according to the invention is −34° C.

This Example again shows that, in the absence of an alkali metal salt of an aliphatic or alicyclic alcohol in the catalytic system, polymerisation (even when carried out continuously with a (polar agent:initiator) molar ratio of very much higher than 3) does not give rise to a mass content of cyclic vinyl units of at least 15% for a linear elastomer with a molecular weight $Mn$ of greater than 100,000 g/mol.

COMPARATIVE EXAMPLE 3a

Production of a "Control", High Molecular Weight Starred SBR Containing no Vinylcyclopentane Units This SBR is produced continuously in a 14 litre perfectly stirred reactor.

Toluene, butadiene, styrene, tetrahydrofuran and dimethoxyethane are introduced into this reactor in quantities by weight of 100:10.15:4.15:0.68:0.25 respectively. 200 µmol of n-BuLi per 100 g of monomers are introduced via the line inlet in order to neutralise the protic impurities introduced by the various constituents present in this line inlet. 150 µmol of n-BuLi per 100 g of monomers are introduced at the reactor inlet.

The (polar agent:n-BuLi) molar ratio is approximately 569.

The various flow rates are adjusted such that the average dwell time in the reactor is 40 minutes and the temperature is maintained at 60° C.

The conversion rate, which is measured on a sample taken at the reactor outlet, is 87%, and the inherent viscosity of the linear SBR obtained, which is measured at 0.1 g/dl in toluene, is 2.61 dl/g. At the reactor outlet, a starring agent consisting of propylene glycol carbonate is introduced, then this starred SBR is subjected to antioxidant treatment with 0.2 phr of 2,2'-methylene-bis(4-methyl-6-tert.-butylphenol) and 0.2 phr of N-(1,3-dimethylbutyl)-N'-phenyl-p-phenylenediamine.

The weight $Mn$ of this starred SBR is 250,000 g/mol, and the Ip index is 1.89.

This "control" starred SBR has a mass content of styrene linkages of 25%. The butadiene moiety has a mass content of vinyl units of 58% and no vinylcyclopentane units are detected.

Prior to extension with oil, the Tg of this "control" SBR according to the invention is −24° C.

This Example clearly shows that an aromatic polymerisation solvent, such as toluene, is not suitable for obtaining cyclic vinyl units in the high molecular weight diene elastomer obtained.

EXAMPLE 4

Production of a High Molecular Weight Starred SBR According to the Invention

This SBR according to the invention is produced continuously under conditions identical to those described in Example 3, except that, in addition to the above-stated constituents, a solution of sodium tert.-amylate is introduced into the reactor in a sodium:active lithium ratio of 0.04 and 660 µmol of n-BuLi per 100 g of monomers are introduced at the reactor inlet. The (sodium:tetramethylethylenediamine) molar ratio is 0.002. The conversion rate, which is measured on a sample taken at the reactor outlet, is 90%, and the inherent viscosity of the linear SBR obtained, which is measured at 0.1 g/dl in toluene, is 2.30 dl/g. This linear SBR has a number-average molecular weight $Mn$ of 150,000 g/mol.

The (TMEDA:n-BuLi) molar ratio is approximately 15.5.

This SBR is starred as stated in as Example 3.

This starred SBR has a weight $Mn$ of 260,000 g/mol and an Ip index of 2.56.

The mass content of styrene linkages in this starred SBR according to the invention is 6%. In the butadiene moiety, the mass content of vinyl linkages is 57% and the mass content of vinylcyclopentane units is 22%.

Prior to extension with oil, the Tg of this SBR according to the invention is −25° C.

This Example shows that, by incorporating an alkali metal salt of an aliphatic or alicyclic alcohol into the catalytic system, polymerisation (carried out continuously with a (polar agent:initiator) molar ratio of greater than 15) gives rise to a mass content of cyclic vinyl units of greater than 20% for a linear elastomer of a molecular weight of greater than 150,000 g/mol.

EXAMPLE 5

Production of a High Molecular Weight Starred BR According to the Invention

This polybutadiene (BR) according to the invention is produced continuously under conditions identical to those described in Example 4, except that 14.3 parts per 100 parts of cyclohexane are introduced into the reactor, that no styrene is introduced into the reactor and that 600 µmol of n-BuLi per 100 g of monomers are introduced at the reactor inlet.

The (TMEDA:n-BuLi) molar ratio is approximately 17.1.

The conversion rate, which is measured on a sample taken at the reactor outlet, is 92%, and the inherent viscosity of the linear BR obtained, which is measured at 0.1 g/dl in toluene, is 1.86 dl/g. The molecular weight $Mn$ of this linear BR is 130,000 g/mol.

As previously, the starring agent is introduced at the reactor outlet before the starred BR is subjected to the same antioxidant treatment.

This starred BR has a weight Mn of 181,000 g/mol and an Ip index of 2.89.

This starred BR has a mass content of vinyl linkages of 56% and a mass content of vinylcyclopentane units of 20%.

Prior to extension with oil, the Tg of this BR according to the invention is −29° C.

This Example also shows that, by incorporating an alkali metal salt of an aliphatic or alicyclic alcohol into the catalytic system, polymerisation (carried out continuously with a (polar agent:initiator) molar ratio of greater than 15) gives rise to a mass content of cyclic vinyl units of greater than 20% with a linear polybutadiene of a molecular weight of greater than 100,000 g/mol.

EXAMPLE 6

Production of a High Molecular Weight Starred SBR According to the Invention The polymer is produced continuously in a 0.8 litre perfectly stirred reactor.

Cyclohexane, butadiene, styrene, tetramethylethylenediamine are introduced into this reactor in quantities by weight 100:13.15:1.13:0.29 respectively. 200 μmol of n-BuLi per 100 g of monomers are introduced via the line inlet in order to neutralise the protic impurities introduced by the various constituents present in this line inlet. 1200 μmol of n-BuLi per 100 g of monomers are introduced at the reactor inlet.

The (TMEDA:n-BuLi) molar ratio is approximately 14.6.

The various flow rates are adjusted such that the average dwell time in the reactor is 40 minutes and the temperature is maintained at 80° C.

The conversion rate, which is measured on a sample taken at the reactor outlet, is 92%, and the inherent viscosity of the linear SBR obtained, which is measured at 0.1 g/dl in toluene, is 1.35 dl/g. The molecular weight Mn of this linear SBR is 75,000 g/mol.

At the reactor outlet, a starring agent consisting of methyltrichlorosilane is introduced (400 μmol per 100 g of monomers), then this starred SBR is subjected to antioxidant treatment with 0.2 phr of 2,2'-methylene-bis(4-methyl-6-tert.-butylphenol) and 0.2 phr of N-(1,3-dimethylbutyl)-N'-phenyl-p-phenylenediamine.

The weight Mn of this starred SBR is 120,000 g/mol, and the Ip index is 1.89. The viscosity of the starred polymer is 1.85 dl/g.

This starred SBR has a mass content of vinyl units of 51% and a mass content of vinylcyclopentane units of 18%.

Prior to extension with oil, the Tg of this SBR according to the invention is −28° C.

This Example shows that it is not necessary to incorporate an alkali metal salt of an aliphatic or alicyclic alcohol into the catalytic system in order to obtain, after polymerisation (carried out continuously with a (polar agent:initiator) molar ratio of greater than 10), a mass content of cyclic vinyl units of greater than 15% for a linear elastomer of a molecular weight Mn of between 50,000 and 100,000 g/mol.

EXAMPLE 7

Production of a Low Molecular Weight Linear SBR According to the Invention

Polymerisation is performed continuously in a 0.8 litre perfectly stirred reactor. Cyclohexane, butadiene, styrene and tetramethylethylenediamine are introduced into this reactor in quantities by weight of 100:12.30:2:0.35 respectively (the quantity of tetramethylethylenediamine in the reaction medium being approximately 3000 ppm). 200 μmol of n-BuLi per 100 g of monomers are introduced via the line inlet in order to neutralise the protic impurities introduced by the various constituents present in this line inlet. 1500 μmol of n-BuLi per 100 g of monomers are introduced at the reactor inlet, such that the (tetramethylethylenediamine:n-BuLi) molar ratio is approximately 14.1.

The various flow rates are adjusted such that the average dwell time in the reactor is 40 minutes and the temperature is maintained at 80° C.

The conversion rate, which is measured on a sample taken at the reactor outlet, is 98%, and the inherent viscosity, which is measured at 0.1 g/dl in toluene, is 0.90 dl/g. At the reactor outlet, the SBR obtained is subjected to the antioxidant treatment mentioned in the above Examples.

The weight Mn of the SBR obtained is 50,000 g/mol.

This SBR according to the invention has a mass content of styrene linkages of 16% and, in the butadiene moiety, a mass content of vinyl units of 57% and a mass content of vinylcyclopentane units of 17%.

Prior to extension with oil, the Tg of this SBR according to the invention is −19° C.

This Example also shows that it is not necessary to incorporate an alkali metal salt of an aliphatic or alicyclic alcohol into the catalytic system in order to obtain, after polymerisation (carried out continuously with a (polar agent:initiator) molar ratio of greater than 10), a mass content of cyclic vinyl units of greater than 15% for a linear elastomer of a molecular weight Mn of 50,000 g/mol.

EXAMPLE 8

Production of a Low Molecular Weigh Linear SBR According to the Invention

This SBR according to the invention is produced continuously under conditions identical to those described in Example 6, except that, in addition to the above-stated constituents, a solution of sodium tert.-amylate is introduced into the reactor in a sodium:active lithium ratio of 0.4. The (sodium:tetramethylethylenediamine) molar ratio is 0.05. The conversion rate, which is measured on a sample taken at the reactor outlet, is 99%, and the inherent viscosity of the SBR obtained, which is measured at 0.1 g/dl in toluene, is 0.43 dl/g. The (TMEDA:n-BuLi) molar ratio is approximately 14.1.

This linear SBR according to the invention has an Mn of 6,000 g/mol.

In this SBR according to the invention, the mass content of styrene linkages is 16% and, in the butadiene moiety, the mass content of vinyl linkages is 43% and the mass content of vinylcyclopentane units is 40%.

The Tg of this SBR according to the invention is −12° C.

This Example shows that, by incorporating an alkali metal salt of an aliphatic or alicyclic alcohol into the catalytic system, polymerisation (carried out continuously with a (polar agent:initiator) molar ratio of greater than 10) gives rise to a very high mass content of cyclic vinyl units (greater than 35%) for a linear elastomer of a molecular weight of less than 30,000 g/mol.

The invention claimed is:

1. A process for the production of a linear or branched diene elastomer resulting from at least one conjugated diene, said elastomer comprising cyclic vinyl units in a mass content of greater than or equal to 15% and, prior to optional branching, having a number-average molecular weight falling within a range of from 10,000 to 300,000 g/mol, said process comprising the anionic polymerization of one or more monomers comprising at least one conjugated diene monomer, by a continuous reaction, in an inert aliphatic or alicyclic hydrocarbon solvent, of said monomer or monomers with a catalytic system comprising an organolithium initiator, a polar agent comprising two or more heteroatoms, and an alkali metal salt of an aliphatic or alicyclic alcohol, such that said system simultaneously satisfies the following three conditions:
  (i) the (polar agent:initiator) molar ratio is greater than or equal to 3,
  (ii) the (salt:initiator) molar ratio falls within a range of from 0.01 to 2, and
  (iii) the (salt:polar agent) molar ratio falls within a range of from 0.001 to 0.5.

2. A process for the production of a linear or branched diene elastomer according to claim 1, wherein the (polar agent:initiator) molar ratio is greater than or equal to 5.

3. A process for the production of a linear or branched diene elastomer according to claim 2, wherein the (polar agent:initiator) molar ratio is greater than or equal to 10.

4. A process for the production of a linear or branched diene elastomer according to claim 3, wherein the (polar agent:initiator) molar ratio is greater than or equal to 15.

5. A process for the production of a linear or branched diene elastomer according to claim 1, wherein said (salt:polar agent) molar ratio falls within a range of from 0.001 to 0.1.

6. A process for the production of a linear or branched diene elastomer according to claim 1, wherein said (salt:initiator) molar ratio falls within a range of from 0.01 to 0.6.

7. A process for the production of a linear or branched diene elastomer according to claim 6, wherein said (salt:initiator) molar ratio falls within a range of from 0.01 to 0.2.

8. A process for the production of a linear or branched diene elastomer according to claim 7, wherein said (salt:initiator) molar ratio falls within a range of from 0.3 to 0.6.

9. A process for the production of a linear or branched diene elastomer according to claim 1, wherein said salt is a sodium salt of an aliphatic alcohol having from 3 to 12 carbon atoms.

10. A process for the production of a branched diene elastomer according to claim 1, which further comprises reacting the product of said polymerization with a coupling or starring agent in order to obtain said branched diene elastomer.

11. A process for the production of a linear or branched diene elastomer according to claim 9, wherein said salt is sodium tert. amylate.

12. A process for the production of a linear or branched diene elastomer resulting from at least one conjugated diene, said elastomer comprising cyclic vinyl units in a mass content of greater than or equal to 15% and, prior to optional branching, having a number-average molecular weight falling within a range of from 10,000 to 60,000 g/mol, said process comprising the anionic polymerization of one or more monomers comprising at least one conjugated diene monomer, by a discontinuous reaction, in an inert aliphatic or alicyclic hydrocarbon solvent, of said monomer or monomers with a catalytic system comprising an organolithium initiator and a polar agent comprising two or more heteroatoms, the (polar agent:initiator) molar ratio being greater than 8,
  wherein said polar agent is tetramethylethylenediamine.

13. A process for the production of a branched diene elastomer according to claim 12, which further comprises reacting the product of said polymerization with a coupling or starring agent in order to obtain said branched diene elastomer.

14. A catalytic system usable for producing, by continuous anionic polymerization of one or more conjugated dienes in an inert aliphatic or alicyclic hydrocarbon solvent, a linear diene elastomer resulting from at least one conjugated diene, wherein said diene elastomer comprises cyclic vinyl units in a mass content of greater than or equal to 15% and having a number-average molecular weight falling within a range of from 50,000 to 300,000 g/mol, wherein said system comprises an organolithium initiator, a polar agent comprising two or more heteroatoms and an alkali metal salt of an aliphatic or alicyclic alcohol, said system simultaneously satisfying the following three conditions:
  (iv) the (polar agent:initiator) molar ratio is greater than or equal to 10,
  (v) the (salt:initiator) molar ratio falls within a range of from 0.01 to 2, and
  (vi) the (salt:polar agent) molar ratio falls within a range of from 0.001 to 0.5,
  wherein said polar agent belongs to the group consisting of diamines and diethers.

15. A catalytic system according to claim 14, wherein said salt is a sodium salt of an aliphatic alcohol having from 3 to 12 carbon atoms.

16. A catalytic system according to claim 15, wherein said salt is sodium tert. amylate.

17. A catalytic system according to claim 14, wherein said (salt:initiator) molar ratio falls within a range of from 0.01 to 0.2.

18. A catalytic system according to claim 14, wherein said (salt:initiator) molar ratio falls within a range of from 0.3 to 0.6.

19. A catalytic system usable for producing, by continuous anionic polymerization of one or more conjugated dienes in an inert aliphatic or alicyclic hydrocarbon solvent, a linear diene elastomer resulting from at least one conjugated diene, wherein said diene elastomer comprises cyclic vinyl units in a mass content of greater than or equal to 15% and having a number-average molecular weight falling within a range of from 50,000 to 300,000 g/mol,
  wherein said system comprises an organolithium initiator, a polar agent comprising two or more heteroatoms and an alkali metal salt of an aliphatic or alicyclic alcohol, said system simultaneously satisfying the following three conditions:
  (iv) the (polar agent:initiator) molar ratio is greater than or equal to 10,
  (v) the (salt:initiator) molar ratio falls within a range of from 0.01 to 0.2 or from 0.3 to 2, and
  (vi) the (salt:polar agent) molar ratio falls within a range of from 0.001 to 0.1.

20. A catalytic system according to claim 19, wherein said (polar agent:initiator) molar ratio is greater than or equal to 15.

21. A catalytic system according to claim 19, wherein said (salt:initiator) molar ratio falls within a range of from 0.01 to 0.2.

22. A catalytic system according to claim 19, wherein said (salt:initiator) molar ratio falls within a range of from 0.3 to 0.6.

23. A catalytic system according to claim 19, wherein said polar agent belongs to the group consisting of diamines and diethers.

24. A catalytic system usable for producing, by continuous or discontinuous anionic polymerization of one or more conjugated dienes in an inert aliphatic or alicyclic hydrocarbon solvent, a linear diene elastomer comprising cyclic vinyl units in a mass content of greater than or equal to 15% and having a number-average molecular weight falling within the range of from 10,000 to 60,000 g/mol, said system comprising an organolithium initiator and a polar agent comprising two or more heteroatoms, wherein the (polar agent:iitiator) molar ratio is greater than or equal to 10, wherein said polar agent is tetramethylethylenediamine.

25. A catalytic system usable for producing, by continuous anionic polymerization of one or more conjugated dienes in an inert aliphatic or alicyclic hydrocarbon solvent, a linear diene elastomerresulting from at least one conjugated diene, wherein said diene elastomer comprises cyclic vinyl units in a mass content of greater than or equal to 15% and having a number-average molecular weight falling within a range of from 50,000 to 300,000 g/mol, wherein said system comprises an organolithium initiator, a polar agent comprising two or more heteroatoms and an alkali metal salt of an aliphatic or alicyclic alcohol, said system simultaneously satisfying the following three conditions:

(iv) the polar agent:initiator molar ratio is equal to or greater than 14.1, (v) the (salt:initiator) molar ratio falls within a range of from 0.01 to 2, and (vi) the (salt:polar agent) molar ratio falls within a range of from 0.001 to 0.5.

* * * * *